United States Patent [19]

Kowalski et al.

[11] Patent Number: 4,563,506

[45] Date of Patent: Jan. 7, 1986

[54] EXTRUSION PROCESS FOR PREPARING IMPROVED BROMINATED BUTYL RUBBER

[75] Inventors: Ronald C. Kowalski, New Providence; William M. Davis; Neil F. Newman, both of Edison; Zisis A. Foroulis, Mendham, all of N.J.; Francis P. Baldwin, Coupeville, Wash.

[73] Assignee: Exxon Research & Engineering Co., Florham Park, N.J.

[21] Appl. No.: 656,664

[22] Filed: Oct. 1, 1984

Related U.S. Application Data

[63] Continuation-in-part of Ser. No. 651,621, Sep. 17, 1984, which is a continuation-in-part of Ser. No. 481,320, Apr. 1, 1983.

[51] Int. Cl.$^4$ .................................................. C08F 8/22
[52] U.S. Cl. ................................ 525/354; 525/333.1; 525/355; 525/356; 525/359.1; 525/359.2; 525/359.3
[58] Field of Search ............ 525/354, 355, 356, 359.1, 525/359.2, 359.3

[56] References Cited

U.S. PATENT DOCUMENTS

| | | | |
|---|---|---|---|
| 3,023,191 | 2/1962 | Tegge et al. | 525/356 |
| 3,242,148 | 3/1966 | Kinchen et al. | 525/356 |
| 3,510,416 | 5/1970 | Vaccarri et al. | 525/356 |
| 3,936,430 | 2/1976 | Schoen et al. | 525/356 |
| 4,185,057 | 1/1980 | Rossiter et al. | 264/40.1 |
| 4,288,575 | 9/1981 | Gardner | 525/356 |

FOREIGN PATENT DOCUMENTS 1483063 8/1977 United Kingdom .
1483064 8/1977 United Kingdom .

*Primary Examiner*—Joseph L. Schofer
*Assistant Examiner*—Bernard Lipman
*Attorney, Agent, or Firm*—A. Lagani

[57] ABSTRACT

A process for the continuous bromination of butyl rubber polymer by contacting the polymer with a brominating agent in a continuous flow device in which means are provided for disengaging reaction by-products and unreacted halogenating agents from the reaction mixture, by deforming and disrupting the brominated polymer surface and injecting a neutralizing agent into the polymer immediately after reaction thereby neutralizing the polymer, comprising contacting a polymer substantially free of acid scavengers, with the brominating agent at elevated temperatures the bromination reaction being carried out in an acid atmosphere, thereby producing a polymer having a substantial fraction of the bromine in the primary allylic position.

109 Claims, No Drawings

EXTRUSION PROCESS FOR PREPARING IMPROVED BROMINATED BUTYL RUBBER

CROSS REFERENCE TO RELATED APPLICATIONS

This application is a continuation-in-part of copending application Ser. No. 651,621 filed Sept. 17, 1984, which in turn is a continuation-in-part of copending application Ser. No. 481,320 filed Apr. 1, 1983.

FIELD OF THE INVENTION

This invention relates to an extrusion process for preparing brominated butyl rubber having a substantial fraction of the bromine in the primary allylic position.

BACKGROUND OF THE INVENTION

One of the first olefinically unsaturated synthetic elastomers to be commercially produced was butyl rubber. The expression "butyl rubber" is used in the rubber industry to describe copolymers made from a polymerization reaction mixture having therein from 70 to 99.5% by weight of an isoolefin which has about 4 to 7 carbon atoms, e.g. isobutylene, and about 30 to 0.5% by weight of a conjugated multiolefin having from 4 to 14 carbon atoms, e.g. isoprene. The resulting copolymers contain 85 to 99.5% by weight combined isoolefin and about 0.5 to about 15% combined multiolefin.

The preparation of butyl rubber is described in U.S. Pat. No. 2,356,128, which is incorporated herein by reference. The polymer backbone of commercial butyl rubber is made up primarily of isobutylene units, with just a few percent isoprene units. The isoprene units contribute the small amount of unsaturation present in butyl rubber. The basic preparative equations are represented by:

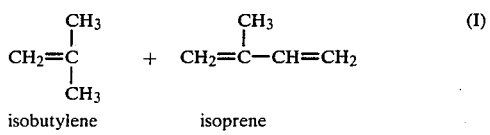

which combine to form its main structure:

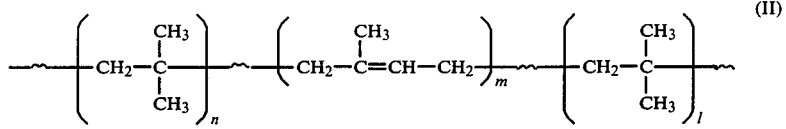

wherein n+1 represents the number of isoolefin units incorporated in the butyl rubber, while m represents the number of diolefin units present, substantially as isolated units. The conjugated diolefin loses its diene unsaturation upon its incorporation into the polymer backbone.

Thus butyl rubber, as presently produced, contains only a small percentage of unsaturation, in the form of the monoolefin structure associated with the isoprene residue which is incorporated more or less randomly throughout the polymer chain.

Numerous references teach methods for halogenating various polymers. Generally, these references are limited to reactions in solution or are batch rather than continuous processes. There are, for example, references that teach the halogenation of butyl rubber, but each suffers from serious limitations. An early reference, U.S. Pat. No. 2,944,578, teaches that chlorinated butyl rubber can be produced in a batch process by dissolving butyl rubber in a suitable, nonreactive solvent, e.g., hexane, and introducing chlorine or a chlorinating agent. By suitable control of the temperature, concentrations of chlorinating agent and rubber, and reaction time, chlorinated rubber containing the desired level of chlorine is produced. However, a batch process is inherently inefficient, and the need to dissolve the rubber in a solvent incurs significant expenses for solvent recovery and environmental control.

An improved, continuous process for chlorination or bromination of butyl rubber was subsequently disclosed in U.S. Pat. No. 3,099,644. However, that process still required the preparation and use of a solution of butyl rubber, which, in addition to the limitations noted above, is limited as to the concentration of rubber which can be processed, and which requires significant equipment and process control to precipitate the halogenated rubber from solution and then dry the rubber in a controlled manner so as to avoid degradation. The halogenation of ethylene-propylene nonconjugated diene elastomers (EPDM) has also been disclosed; such processes are analogous to those for halogenating butyl rubber. For example, U.S. Pat. No. 4,051,083 describes the solution bromination and chlorination of EPDM using N-halosuccinimide; additionally, the "neat" halogenation of EPDM is also described. In the latter disclosure the halogenating agent is dispersed in the EPDM by blending on a cool rubber mill and halogenation is effected by heating the mixture in a hydraulic press.

Halogenation of EPDM in an aqueous batch process is disclosed in U.S. Pat. No. 3,896,095. The process employs the addition of an excess of $Cl_2$ or $Br_2$ to a polymer slurry to effect halogenation and avoid the expense of solvent recovery systems previously disclosed for solution halogenation processes.

Chlorobromination of polymers such as polybutadiene, butadiene-isoprene copolymers and natural or synthetic polyisoprene is disclosed in British Pat. Nos. 1,483,063 and 1,483,064. The reaction is described as taking place at a low temperature of 0–15 degrees C., preferably in an inert solvent, and the halogenated products are described as containing high levels, e.g., at least 55% by weight of halogen.

A close reading of these references indicates the difficulty with which halogenation of elastomers has been conducted prior to the invention disclosed herein. The various limitations of these batch and continuous solution processes are overcome by the improved process of the present invention.

The possibility of producing a halogenated rubber such as halogenated butyl rubber continuously in an extruder-reactor has been recognized, see, e.g., U.S. Pat. No. 4,185,057. However, the generalized disclosures of that reference do no more than acknowledge the desirability of such a process, but do not teach one how to accomplish such a process. The reference suggests that only enough chlorine be introduced into the extruder to react with the butyl rubber so that no chlorine remains after reaction. It then goes on to suggest that another gas, e.g., nitrogen, be introduced to effect the production of gas filled pores in the finished rubber, which is the primary object of the invention. No examples are disclosed in the patent and no conditions disclosed which would enable one to actually conduct such a butyl halogenation process.

Chlorination of butyl rubber using dichloramine-T and a calendar has been reported by Bulgarian workers (Kh. Tenchev. et al., Chem Abstracts 50756u.) The disclosed process was not intended to produce neat chlorinated butyl since calendering is carried out on a mixture of butyl rubber, accelerators, prevulcanization inhibitors as well as variable amounts of carbon black and dichloramine-T.

The halogenation, in a kneader or extruder, of polymers containing carboxylic acid groups using reagents that differ from those disclosed herein is described in U.S. Pat. No. 3,364,187. The polymers are converted to the acyl halide derivatives using specific halogenating agents. The patent suggests that the kneading step may be carried out in an extruder, a Banbury mixer, a roll mill or any other apparatus that yields the described kneading action.

A British Pat. No. 1,257,016, discloses a process for treating polymers with halogenating agents such as N-bromosuccinimide under mechanical shear for the purpose of producing unsaturation. The patent mentions that halogenation may possibly occur in an intermediate step followed by dehydrohalogenation, but production and isolation of a useful halogenated product is not an objective, nor is it achieved. The process also requires the use of scavenging amounts of a metal oxide or carbonate such as magnesium oxide, zinc oxide or calcium carbonate in addition to the halogenating agent and -olefin polymer. The patent discloses, as an alternate method, the preblending of the halogenating agent with a solution of the polymer followed by solvent removal. It is stated that very little, if any, reaction occurs during such an operation.

An extensive disclosure of polymer modifications conducted in an extruder can be found in U.S. Pat. No. 3,862,265. This patent is directed to modification of polyolefins using heat, shear and controlled pressure to induce degradation in the polyolefin and to combine the polyolefin with a free-radical initiator and/or one or more monomers. The broad disclosure is of value for its teachings directed to the modification of polyolefins with various monomers especially to form novel grafted polymers.

Canadian Pat. No. 1,121,956 describes the treatment of blow-molded articles with fluorine gas to impart barrier properties to the article. It is achieved by introducing a mixture of fluorine and an inert gas into the interior surface of a parison before charging the parison into a blow-mold; the parison is then expanded by an inert gas under pressure. Such batchwise surface treatment method is not particularly relevant to the continuous whole-polymer modification process disclosed herein.

U.S. Pat. No. 3,510,416 (Vaccari et al) teaches an improved method of halogenating PVC particles by using gaseous hydrogen in combination with a swelling agent (chlorination carrier). Following reaction, the PVC particles are transferred to another piece of equipment (a dryer) in which the chlorination carrier is stripped and gaseous by-products are separated. This reference discloses a process based on particle fluidization which relies on diffusion to accomplish drying; in addition, such a process requires separate pieces of equipment and relatively long times for drying.

Some polymers are particularly sensitive when exposed to shear and elevated temperatures in the presence of a halogenating agent. For example, butyl rubber is subject to degradation under such conditions and this has made the achievement of a halogenated butyl product using an extruder-reactor a difficult goal, and, until the invention described at the end of this section, a goal that had not yet been achieved. The halogenation reaction of butyl rubber in solution is described in "Encyclopedia of Chemical Technology," Kirk-Othmer, Third Edition (1979), Volume 8 at page 476 ff. It is noted that the halogenation reaction carried beyond one halogen atom per olefin unit is complicated by chain fragmentation. Indeed, such fragmentation or degradation is a persistent problem when halogenation of butyl rubber is attempted; that problem is aggravated under conditions of heat and shear.

An additional difficulty in this field of polymer modification is the dehydrohalogenation reaction. One means of suppressing such a reaction is the addition of stabilizers which can be added, e.g., to a solution of halogenated butyl to protect against this reaction during processing. It is also necessary to avoid other undesirable side reactions which vary depending on the particular polymer being halogenated. Such reactions are further aspects of the sensitivity of the polymers to the severe halogenation reaction that has made the achievement of controlled halogenation of neat polymers in an extruder-reactor a previously elusive goal.

Other difficulties which are encountered in attempting to halogenate neat polymers include: the problem of mixing a highly viscous polymer phase with a low viscosity halogenating agent phase (e.g., where a gaseous halogenating agent is used this difference can be as much as ten orders of magnitude); the low probability of the halogenating agent encountering the reactive site on the polymer, particularly when a low functionality polymer is employed (e.g., butyl rubber, isobutylene/isoprene copolymer); and the difficulty of removing from contact with the polymer, i.e., disengaging, potentially damaging by-products of the reaction, e.g., hydrogen halide. These problems and others have been overcome by the invention disclosed herein.

The reactivity of the butyl rubbers and consequently their cure rate is substantially less than the high unsaturation natural and synthetic rubbers. In an effort to improve cure characteristics of the butyl rubbers, these synthetic polymers have been halogenated. Halogenated butyl rubber has contributed significantly to the elastomer industry. Some forms of halogenated butyl rubber, prepared in solution according to processes described above, are commercially available, e.g., chlorinated butyl rubber and brominated butyl rubber. One method used to prepare halogenated butyl rubber is that of halogenating butyl rubber in a solution (butyl rubber cement) containing between 1 to 60% by weight of butyl rubber in a substantially inert $C_5$-$C_8$ hydrocarbon solvent such as pentane, hexane, heptane, etc., and contacting this butyl rubber cement with a halogen for a period of up to about 25 minutes. There is then formed the halogenated butyl rubber and a hydrogen halide, the polymer containing up to one or somewhat more halogen atoms per double bond initially present in the polymer. Generally, halogenated butyl rubber comprises a copolymer of 85 to 99.5% wt.% of a $C_4$ to $C_8$ isoolefin, e.g., isobutylene, with 15 to 0.5 wt.% of a $CH_4$ to $C_{14}$ halogenated rubber where the rubber contains conjugated diene which is represented as

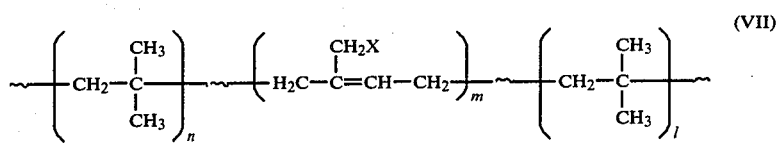

multiolefin, e.g., isoprene, containing at least about 0.5 wt.% combined halogen in its structure. For example, where butyl is halogenated with bromine, the bromine can be present in the brominated butyl in an amount of from about 1.0 to about 3.0 wt.%, preferably from about 1.5 to about 2.5 wt.%. A method of preparing conventionally halogenated butyl rubber is described in U.S. Pat. No. 3,099,644, referred to above, which is incorporated herein by reference.

The preparation, in solution, of halogenated butyl rubber containing both bromine and chlorine, i.e., bromochlorinated butyl rubber, is described in U.S. Pat. No. 4,254,240, incorporated herein by reference. The potential for molecular weight breakdown of the butyl rubber, noted earlier, is present even where bromine chloride is used as the halogenating agent, as disclosed in this reference (column 4, lines 24–32). The structural formula for halogenated butyl rubber is typically represented as being:

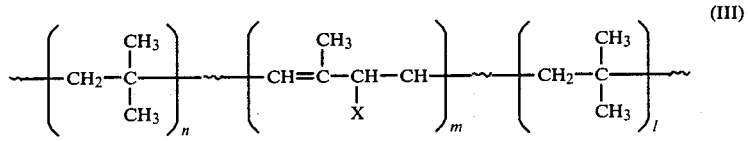

where X represents the halogen, and 1 and m have the same values as described above for butyl rubber. This structure, however, is one of several which can be formed, depending on the conditions of halogenation, the halogenating agent, used etc. Other structural configurations which may occur in halogenated butyl rubbers are In this structure the halogen, X, is in a primary allylic position. The method disclosed in U.S. Pat. No. 4,288,575 for preparing these rubbers involves the use of a copper oxide catalyst useful for dehydrohalogenation of butyl rubber to form a conjugated diene rubber.

As shown in Example 6 of the Gardner '575 patent this primary halogen is in a more stable configuration than the secondary halogens of the prior art and is not readily removed. The copper oxide catalyst was taught in Gardner's earlier U.S. Pat. No. 4,145,492 to be a dehydrohalogenation catalyst suitable for the preparation of conjugated diene rubber.

Table I of U.S. Pat. No. 4,288,575 shows various halogenated conjugated diene-containing polymers which are shown to have the halogen in the primary position. Not surprisingly, the residual halogen is always associated with substantial amounts of conjugated diene.

Where high amounts of residual halogen are present in the polymer, as in Run A of Table I of U.S. Pat. No. 4,288,575, it is the result of an initially high level of halogenation; here 1.95 wt. % bromine. Since the degree of rearrangement is proportional to the degree of dehydrohalogenation Gardner's polymers cannot be low in conjugated diene and at the same time have appreciable amounts of halogen present in the primary allylic position.

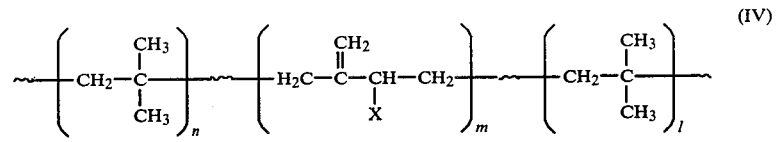

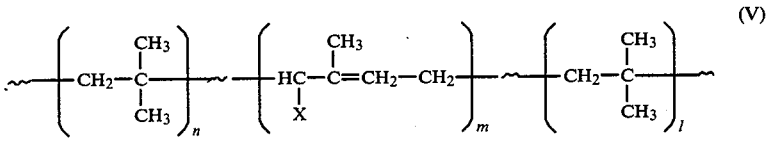

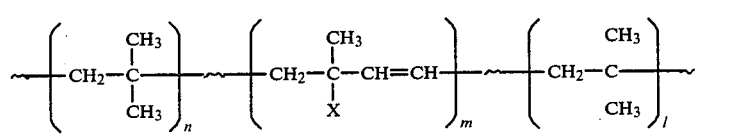

It will be noted that in each case the halogen is present as a secondary or tertiary allylic halogen.

More recently, U.S. Pat. No. 4,288,575 to Irwin Gardner (which has an effective filing date of Mar. 7, 1977) discloses a new structural configuration for the In 1979 Van Tongerloo et. al. disclosed a brominated butyl rubber which was low in conjugated diene content (if any) and had the primary halogen configuration. The polymer is represented as having the structure.

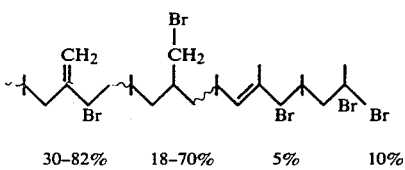

30–82%  18–70%  5%  10%

The reference states that the polymer was produced by a proprietary method and Van Tongerloo et. al. disclose only that rearrangement to the more stable primary configuration can be accomplished in brominated butyl rubber "under a variety of conditions—for example, in the presence of acid, free radicals, bases or heat." See Van Tongerloo, A. and Vokov, R., *Proceedings, International Rubber Conference,* Milan, Italy, 1979, p. 70ff. The skilled chemist will recognize that this gratuitous disclosure represents the techniques which can be enumerated to accomplish an infinite number of reactions. The disclosure in no way teaches any method to prepare the polymer disclosed.

Van Tongerloo et. al. designate the methylene configuration of Formula VI above as "EXO" and the primary bromo configuration of Formula V as "ENDO." It is alleged that even at ratios of ENDO: EXO of 71:16 there is no clear indication of a correlation between vulcanizate properties and polymer microstructure. Hence, Van Tongerloo et. al. have not appreciated that the polymer which they purportedly made by an undisclosed proprietary process has any properties which are different than those of conventional halogenated butyl rubber.

Subsequent to the making of the instant invention, Vukov disclosed that certain model compounds can be heated to 150 degrees C. for 30 minutes to accomplish a molecular rearrangement as follows:

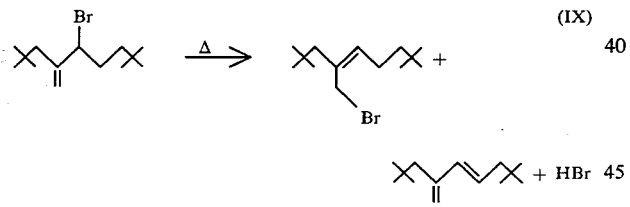

No substantial rearrangement of the chlorinated model was observed. See Vukov, R., "Halogenation of Butyl Rubber and The Zinc Oxide Cross-Linking Chemistry of Halogenated Derivatives" which was presented to the ACS Rubber Division on Oct. 25, 1983. Those skilled in the art will recognize that what is true about simple molecules (model compounds) may not necessarily be true about complex polymer molecules.

Conventional processes, which halogenate polymers such as butyl rubber in solution, incur significant disadvantages. These include high capital investment for the equipment needed to handle, purify, and recycle the solvent, high energy costs for the movement, vaporization, and purification and recycle of the solvent, potential halogenation of the solvent, potential hydrocarbon emissions to the atmosphere and the use of considerable space for the equipment necessary to handle large volumes of solutions.

A previous patent application, filed by two of the inventors herein (U.S. Ser. No. 306,882), filed Sept. 30, 1981 now U.S. Pat. No. 4,384,072 issued May 17, 1983) disclosed an improved halogenation process in which neat rubber was halogenated in an extruder. A significant feature of the earlier invention was injection of the halogenating agent at a position filled with rubber and subjecting the rubber and agent to a high degree of mixing. The invention disclosed herein is a further, significant improvement over such a process.

SUMMARY OF THE INVENTION

In accordance with the present invention an improved process has been discovered for the continuous bromination of butyl rubber producing a brominated butyl rubber wherein the bromine is present in the polymer in a primary position allylic to the sites of unsaturation. The improved process of this invention comprises contacting a cohesive polymer mass with a brominating agent in a continuous flow device comprising means for conveying the polymer through the device wherein the byproducts of the halogenation reaction and unreacted brominating agent are disengaged from the brominated polymer mass in the continuous flow device downstream of a reaction zone in which the butyl rubber polymer is contacted with the brominating agent by means comprising continuously disrupting and deforming the polymer so as to continually generate fresh polymer surface for contact with the brominating agent. The brominated polymer is disengaged from bromination reaction by-products and unreacted brominating agent prior to exiting the continuous flow device. This disengagement can be accomplished either by wet or dry neutralization techniques. A requirement for producing brominated butyl rubber wherein a substantial fraction of the bromine is in the primary allylic position by the process of this invention is that the bromination must be carried out under acid conditions. Furthermore, the bromination must be carried out at elevated temperatures, preferably at a temperature in excess of 120 degrees C. and the mole ratio of bromine in the polymer to initial olefinic unsaturation in the feed polymer is preferably at least 0.7/1 more preferably at least 1/1, most preferably about 1.25/1. Where a gaseous brominating agent is utilized the bromination is preferably conducted above the dew point of the brominating agent.

In a preferred embodiment, the improved polymer bromination process is conducted in extruder-reactor comprising a feed zone, a reaction zone and a neutralization zone. The extrusion screw must have sufficient clearance so that excessive shear of the polymer is avoided. This end is achieved by maintaining the ratio of the clearance between the screw flight and barrel to the radius of the screw at, at least 0.05.

The brominated butyl rubbers produced by the process of this invention are more reactive than conventional brominated butyl rubber. As a consequence they form improved bonds when covulcanized with high unsaturation rubbers in sulfur cures. They therefore find particular application as inner liners for tubeless tires. Additionally, they have utility in applications in which conventional butyl rubber is suitable, e.g. inner tubes, mechanical goods, hoses, and electrical products.

DETAILED DESCRIPTION

This invention relates to a process for preparing a brominated butyl rubber having improved cure and adhesion properties. More particularly it relates to brominated butyl rubber wherein a substantial fraction of the available bromine is present as a primary allylic bromine.

In the practice of this invention butyl rubber is brominated in a continuous flow device under conditions which favor a rearrangement of the bromine in the polymer from the secondary or tertiary allylic position to a primary allylic position. This result is accomplished by carrying out the bromination in a reaction zone which is maintained in the acid state at a temperature in excess of 120° C.

The butyl rubber copolymers useful in the present invention contain a major proportion, preferably at least 70 wt.%, of isoolefins and a minor proportion, preferably not more than about 30 wt.%, of multiolefins. Copolymers of this general type, especially where the copolymer contains about 85–99.5% (preferably 95–99.5%) of a $C_4$–$C_7$ isoolefin, such as isobutylene, with about 15–0.5% (preferably about 5–0.5 wt.%) of a multi-olefin of about 4–14 carbon atoms, are commonly referred to in patents and literature as "butyl rubber;" see, for example, the textbook *Synthetic Rubber* by G. S. Whitby (1954 edition by John Wiley and Sons, Inc.), pages 608–609, *Encyclopedia of Chemical Technology*, Third Edition, Volume 8, (1979), pages 470–484, etc. The expression "butyl rubber" as employed in the specification and claims is intended to include copolymers containing about 80–99% by weight of an isoolefin of about 4–7 carbon atoms and about 20–1% of conjugated multi-olefin of about 4–10 carbon atoms. The preparation of butyl-type rubbers is amply described in the literature. In general, it consists of the reaction product of a $C_4$–$C_7$ isoolefin (preferably isobutylene) with a $C_4$–$C_{10}$ (preferably a $C_4$–$C_6$ conjugated diolefin, such as isoprene, butadiene, dimethyl butadiene, piperylene, etc. The reaction product of isobutylene and isoprene is preferred. The preparation of butyl rubber is described in U.S. Pat. No. 2,356,128 which is incorporated herein by reference.

Conventional high molecular weight butyl rubber generally has a number average molecular weight of about 25,000 to about 500,000, preferably about 80,000 to about 300,000, especially about 100,000 to about 250,000; and a Wijs Iodine No. of about 0.5 to 50, preferably 1 to 20. More recently low molecular weight polymers have also been prepared which have number average molecular weights of from 5,000 to 30,000 and unsaturation expressed as mole %, of 2–10. The viscosity average molecular weight (Mv) of commercial butyl rubber is about 100,000 to about 500,000, preferably about 250,000 to about 500,000.

The isoprene utilized in the manufacture of butyl rubber is generally incorporated into the rubber in the following configuration:

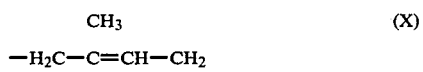

(X)

the halogen is generally incorporated in a configuration depicted as

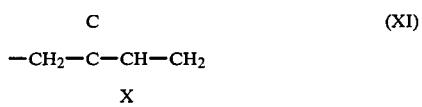

(XI)

wherein X is halogen. The site of unsaturation is external to the backbone of the polymer. In the butyl rubber polymers of this invention the halogen is incorporated in a structure having the configuration

(XII)

Throughout the specification and claims the configurations of formulas X, XI and XII will be referred to a Type I, II and III configuration respectively, the Type III configuration being the preferred structure of this invention.

In carrying out the process of this invention the butyl rubber is contacted with the brominating agent in a continuous flow device. Suitable devices include kneaders, extruders (employing single or multiple screws, e.g., twin screws), continuous mixers and a recently disclosed blending/extrusion device referred to as a cavity transfer mixer (see, e.g., *European Rubber Journal*, July-August, 1982, pages 29032 and G. M. Gale, U.K. Patent Application No. 8030586, 1980). Although butyl rubber can have very high viscosities even at elevated temperatures, such devices are capable of subjecting polymers to deformation.

The continuous flow device should be capable of initially forming the polymer feed into a cohesive mass and then deforming the polymer, disrupting the polymer surface, thereby exposing fresh, i.e., unreacted, polymer to the halogenating agent. The exposure of new surface does not necessarily require the use of high speeds where, e.g., an extruder is used. However, surface disrupting means are preferably employed (as will be described in detail below), for example, pins, reverse flow sections, a "Maillefer" screw design, the cavities of a cavity transfer mixer, multiple flight screw section, interrupted flight sections, e.g., slotted flights, and combinations thereof.

The deformation forces generated in the continuous flow device are adequate when such forces generate a degree of mixing of the polymer and halogenating agent such that the scale of segregation is, preferably, less than 50 microns, more preferably less than 30 microns, most preferably less than 10 microns. Characterization of the degree of mixing in a two-phase system according to scale of segregation is described in the test, "Principles of Polymer Processing," Z. Tadmor and C. G. Gogos (John Wiley and Sons, 1979), Section 7.5, pages 209 ff.

The halogenation reaction of this invention can be carried out with the reaction zone of the continuous flow device being either filled or partially filled with butyl rubber.

When the region in which the polymer and halogenating agent are brought into contact, e.g., the reaction zone of an extruder-reactor, is not filled with polymer, the halogenating agent is present as a continuous phase and the polymer is present as either a discontinuous or continuous phase; the former is preferred. When each constitute a continuous phase, for ease of reference this is referred to a "co-continuous phase." In this latter situation if the reaction zone was viewed under conditions where deformation of the polymer was stopped, the polymer and halogenating agent would each comprise an independent, continuous phase. A preferred operating mode of the process utilize a reaction zone which is only partially filled with polymer; this permits reaction by-products and unreacted halogenating agent to disengage from the polymer phase. Generally, the polymer is present in the reaction zone to the extent that about 5 to about 95%, preferably 10 to about 75%, more preferably about 15 to about 50%, for example 20 to about 35% of the reaction zone is filled with the polymer. One means of achieving a partially filled reaction zone is to feed, in a controlled manner, less polymer into the reaction zone than the conveying capacity of the zone. The space above the polymer is occupied by the halogenating agent and, as fresh surface is exposed to the halogenating agent and halogenation occurs, hydrogen halide is releaased as a by-product of the reaction. The hydrogen halide "disengages" from the polymer and enters and is present in the halogenating agent phase. In a preferred embodiment, utilization of vent means in the reaction zone facilities removal of the reaction by-product and unreacted halogenating agent. Another preferred embodiment imposes a vacuum on the vent means so as to more efficiently disengage by-product(s) and unreacted halogenating agent. The vent means comprises one or more vents in the contacting region.

Means are provided for contacting the halogenated polymer with neutralization means, for example a neutralizing agent. This can also be viewed as a means of disengaging unwanted reaction by-products and unreacted halogenating agent from the halogenated polymer. The neutralization means and the halogenated polymer can be conveyed concurrently or countercurrently through the continuous flow device; preferably in a neutralization zone following the contacting or reaction zone. The pH of the neutralized, halogenated polymer is, preferably, greater than about 5.0, more preferably greater than about 6.0.

Preferably the various zones which have been described are separated from one another in such a manner as to permit maximum independent control of conditions in each zone. Details and conditions are described below for a preferred embodiment utilizing an extruder-reactor, but the principles disclosed are broadly applicable to the system just discussed.

A preferred embodiment of the process employs an extruder-reactor. The extruder-reactor may be thought of as carrying out the halogenated polymer manufacture in various operating zones:

(A) Feed Zone—in which polymer is introduced into the extruder-reactor in convenient form. This form includes, for example, particles and pellets of plastics as they are produced commercially, particles from bales of rubber which have been comminuted and crumb from the finishing line of a rubber manufacturing plant, each of which can be dry or may contain a low level of water, e.g., about 0 to 15 wt.%, preferably about 0 to 5 wt.%, most preferably about 0 to 1 wt.%, or another solvent or diluent; the latter materials will be described more fully below.

The feed zone is designed to form the polymer feed into a cohesive mass and convey or pump the mass past a restrictive dam which follows the feed zone and distinguishes it from the reaction zone which follows. This operation should be conducted at low shear and temperature consistent with the desired result and at a pressure sufficient to convey the mass, typically up to about 600 psig, preferably up to about 400 psig, most preferably up to about 200 psig. Lower pressures are preferred in order to avoid overheating the polymer. This can be achieved, e.g., by utilizing an extruder screw with relatively deep flights and by keeping the length of the feed zone, i.e., the feed zone screw length, as short as possible commensurate with desired production rates. For example, polymer is introduced at about room temperature and exits from the feed zone at about 60° to 150° C.

A restrictive dam is used to separate the feed zone from the reaction zone which follows it so as to prevent back leakage of reactants. This dam is not restrictive enough, however, to cause excessive over-heating of the polymer. A restrictive dam can be, for example, a reverse flighted screw section, a filled screw section, a shallow flighted screw section, an unflighted screw section, combinations thereof, or other means known in the art. If an unflighted screw section is employed, it can have a larger diameter than the root diameter upstream of it, for example 5–25% larger, but not greater than the screw flight diameter. The restrictive dam length should be about 0.5 to about 8 screw diameters, preferably about 1 to about 5 screw diameters, more preferably about 1.5 to about 4 screw diameters, most preferably about 2 about 3 screw diameters in length. If a reverse flighted screw section is employed it can be single or multi-flighted, preferably multi-flighted.

It should be noted that where the restrictive dam configuration employed is more than a mere separation boundary or region between zones, for example, more than merely an unflighted screw section, the restrictive dam can be considered to be part of the reaction zone itself, for example when a single or multi-flighted reverse flighted screw section is employed. Under such circumstances, the restrictive dam in this region of the extruder-reactor can be a part of or comprise the reaction zone. When the reaction zone is operated under vacuum, the restrictiveness of the dam between the feed and reaction zone can be reduced so as to permit some gas (e.g., air) flow into the reaction zone from the feed zone.

In addition to the polymer which is introduced into the feed zone, an optional diluent may also be added. A diluent can function to reduce the viscosity of the polymer to a level commensurate with subsequent good mixing and halogenation without the necessity for excessive heat and a risk of molecular weight breakdown and undesirable side reactions; it can also function to reduce the temperature of the polymer. The diluent may be volatile saturated hydrocarbon, chlorohydrocarbon or chlorocarbon such as pentane, hexane, methylene chloride, chloroform, or carbon tetrachloride. It may also be a non-hydrocarbon, readily removable from the system downstream, but able to perform the function of temporarily reducing the apparent viscosity of the rubber in the reaction zone. Examples of suitable materials include water, inert gases such as carbon dioxide and air.

The diluent may also be retained with or in the polymer, such as a hydrocarbon oil. Suitable oils include saturated aliphatic oil and rubber process oils such as paraffinic, naphthenic and aromatic types. Where such oils are utilized, the halogenated polymer would contain oil after recovery and drying and would commonly be referred to as "oil extended." Oil extended rubber is well known in the art and various grades of oil extended EPDM, SBR, and polybutadiene made by other means are commercially available. Such products are particularly useful where it is desirable, for example, to extend the rubber with high levels of filler, e.g., carbon black or mineral filler, to obtain properties from high molecular weight polymer which might otherwise be difficult to process because of its inherently high viscosity, etc.

The total amount of diluent, including that which may be present in the feed should not be greater than about 50 wt.% based on the polymer, preferably less than about 15 wt.%, most preferably about 5 to about 10 wt.%.

(B) Reaction Zone—can generally be described as the zone in which the halogenating agent is caused to react with the polymer to completely effect the halogenation reaction while simultaneously minimizing undesired side reactions. Screw configuration in the reaction zone is important to mixing efficiency and achievement of the overall objectives of the process. The configuration should be such as to cause disruption and reorientation of the flow of polymer, as, for example, by the aforementioned use of reverse flights, multiple reverse flights, pin sections, a series of very short alternating reverse and forward screw sections, multiple flight, interrupted flight sections and combinations thereof, and other designs known in the art to improve mixing. Viscosity control of the polymer, effected, in part, by the use of an optional diluent and by control of the molecular weight of the polymer and the polymer temperature as it enters the reaction zone, also determines, to a large extent, deformability. Selection of the temperature level influences the reaction and along with residence time in the reaction zone, the nature of the end product. For maximum economy and continuity of production the choice of materials of construction of the reaction zone is particularly important; this also influences the type and level of potential contaminants in the finished polymer and their influence on long-term storage stability of the polymer as well as chemical reactivity. This is discussed in further detail later in this disclosure.

The bromination process of this invention should be conducted so as to preferably brominate the rubber to the extent of at least one halogen atom per double bond of olefinic unsaturation originally present in the rubber. The mole ratio of bromine to olefinic unsaturation in the feed polymer is preferably at least 0.7/1, more preferably at least 1/1, most preferably about 1.25/1. In order to drive the reaction in the direction of the Type III configuration the level of bromination in the polymer is preferably at least 1.5 wt. %. Control is required in order to avoid over and under halogenation. This can be achieved by, for example, controlling the halogen feed rate in comparison to the rubber feed rate, design of the reaction zone (length, screw features and configuration, injection means, temperature, etc.) and RPM so as to determine time of reaction and to control the relative rates of the desired reaction versus competing side reactions (e.g., halogenation of the olefinic unsaturation as for example the isoprene moiety in butyl versus the isobutylene moiety). The brominating agent can be gaseous, liquid or solid and may be added either in a pure state or diluted with a suitable inert fluid as noted above. Suitable brominating agents include sulfuryl bromide, 1,3-di bromo, -5,5-dimethylhydantoin iodobenzene bromide, bromine, bromine chloride, sodium hypobromite, sulfur bromide and N-bromosuccinimide. Where gaseous bromine chloride is used, gaseous diluents, e.g., nitrogen, argon, air, $CO_2$, etc., can be used when a diluent is desired.

At least under some conditions encountered in extruder halogenation, as, for example, where mixing butyl rubber and the halogenation agent are not as efficient as desired, the use of N-bromosuccinimide may result in predominantly free-radical reactions rather than the preferred ionic reactions.

In this improved process alternative reaction zone mixing techniques are feasible. Injecting halogenating agent at a point or points filled with polymer can facilitate nearly instantaneous mixing. Alternatively the reaction can be allowed to occur at the continuously renewing polymer surface generated by the configuration of the reaction zone and conveying means, e.g., the extruder screw and barrel, in a reaction zone partially filled with polymer. Configuration of the screw and chamber walls should not be so restrictive as to cause excessive pressure and excessive shear heating of the polymer. §pressure at the point of injection need not be very high where the reaction zone is only partially filled with polymer and preferably vented. In addition, injection can be into the space occupied by the halogenating agent, e.g., the vapor space. A moderately positive injection pressure is suitable; the pressure selected should maintain a positive flow into the reaction zone and prevent plugging of the line. The specific pressure chosen is a matter of operating convenience. In the filled system, pressure at the point of injection is about 15 to about 400 psig, preferably 100 to about 300 psig.

Also important for achieving efficient reaction of the polymer and halogenating agent is the incorporation in the reaction zone of means to produce the level of polymer mixing and surface disruption preferred for the practice of this invention. As described earlier, this can be achieved, for example, by utilizing reverse flights on the reaction zone portion of the extruder screw, pins, etc. Other means include operation of the screw at a rotation rate of about 50 to about 600 RPM, preferably about 70 to about 400 RPM, most preferably about 90 to about 200 RPM, and by incorporation of a downstream restrictive dam, of the type described above, to separate the reaction zone from the neutralization zone which follows it.

Characterization of mixing by reference to the "scale of segregation" achieved between the halogenating agent and polymer (generally, any two-phase system) was noted earlier. A preferred scale of segregation in the practice of this invention is less than 50 microns, more preferably less than 30 microns, most preferably less than 10 microns.

Overall, it is desirable, by control of polymer viscosity, chamber and screw design screw RPM and operating pressure, to prevent excessive temperatures in the reaction zone while maintaining high levels of mixing. The reaction zone is preferably maintained at a temperature above 120° C., to about 190° C., preferably about 125° C. to about 175° C., more preferably about 125° C. to about 140° C.

While, ordinarily, it is desirable to minimize the clearance between the extruder barrel wall and the screw flight such is not the case in the process of this invention. In the commercially used extruders the screw clearance is generally about 0.010 inches. In the practice of this invention the clearance can be about 0.048 to about 0.250 inches. The clearance can be expressed in terms of the ratio of the clearance between the screw flight and the inside of the barrel to the radius of the screw. This ratio should be at least 0.05, preferably the ratio is about 0.05 to about 0.333; more preferably about 0.06 to about 0.136, most preferably about 0.08 to about 0.130. In any event the maximum screw clearance should be about 0.250 regardless of the screw diameter.

The pressure-temperature relationship in the reaction zone is such that the brominating agent is preferably gaseous. This end is achieved by operating at a temperature-pressure relationship which is above the dew point of the brominating agent. For example, where the brominating agent is bromine and the reaction zone is maintained at a pressure of about 100 psig the reaction temperature should be at least 130° C. See, for example, Yaws, Carl L., *Physical Properties*, Chapter 1 "The Halogens." The pressure at which the extruder is operated is not critical. However, the lower the pressure the less resultant overheating of the polymer. Where the brominating agent is in a gaseous state the pressure of the brominating agent plus diluent, if any, is preferably about 45 psig to about 100 psig.

(C) Neutralization Zone—in which by-product HBr is neutralized to prevent dehydrohalogenation of the halogenated polymer and to suppress other undesirable side reactions and corrosion of the equipment.

In a preferred embodiment of this invention neutralization is carried out in a water-free environment, referred to in the specification and claims as "dry neutralization," in which by-product HBr is neutralized to prevent dehydrohalogenation of the halogenated polymer and to suppress other undesirable side reactions and corrosion of the equipment. Suitable means to effect neutralization and remove residual unreacted halogenating reagent in this improved process is the injection of an inert gas into the extruder to "sweet out" the by-products and residual halogenation agent. This process is effected by employing process features such as those just described with regard to the reaction zone in order to disrupt the polymer surface and continually expose new surface to the inert gas in the neutralization zone. In a preferred embodiment vent means are provided in the neutralization zone to permit the inert gas and disengaged products to be swept out and immediately removed from the region near the polymer. In a particularly preferred embodiment, the screw configuration in the region of the vent comprises a deep, single flighted screw with little or no mixing occurring in the vicinity of the vent in order to avoid restricting the exiting flow of inert gas and disengaged materials. In another preferred embodiment various additives and/or stabilizers are added to the polymer in the neutralization zone. As discussed earlier, multiple injection sites can be used as well as a supplementary injection zone. In another embodiment, pressure in the system is controlled in order to explosively remove the unwanted products.

In one embodiment of the invention the neutralization zone is designed so that the inert gas contacts the reaction products from the reaction zone as soon as possible after the halogenation reaction in order to prevent dehydrohalogenation of the polymer. This is achieved by utilizing a dam between the reaction and neutralization zones which is as short as possible consistent with its functioning as a restrictive dam. The nature and configuration of various alternatives for the restrictive dam are described above in detail for the dam between the feed and reaction zones. The injection port for the inert gas can be located as close as possible to the downstream end of the dam or the neutralizing reagent can be injected so as to flow countercurrent to the flow of the halogenated product mixture. The term "neutralization" as used in the specification and claims encompasses both conventional neutralization using acid scavengers such as hydroxides and bicarbonates of alkali or alkaline earth metals, amines, etc. as well as the aforedescribed process in which a dry gas is used to sweep out bromination by-products and brominating agents.

(D) Scrubbing Zone—To achieve a halogenated polymer end product not containing usually undesirable materials, where dry neutralization is utilized, the neutralized halogenated rubber can be subjected to supplementary inert gas injection in a scrubbing zone. In a particularly preferred embodiment such scrubbing is performed within the extruder-reactor in a scrubbing zone (D) which sequentially follows neutralization zone (C) and which is traversed by the extruder screw means. In this zone a stream or several streams of inert gas can be run through countercurrent and/or co-current to the flow of neutralized polymer so as to remove the last traces of the products and unreacted halogenating agent.

Polymer stabilizing agents can optionally be added in this zone. This can be done by incorporating the stabilizers at an injection point.

(E) Exit Zone—Preferably the extruder-reactor comprises a final exit zone (E) in which the temperature of the halogenated polymer product is adjusted for delivery therefrom at a temperature below about 130° C., more preferably below about 120° C. and most preferably below about 100° C., as a contribution to the stability of the polymer. Also in the exit zone, stabilizer(s) may initially be added to the scrubbed or washed, halogenated polymer product if not added in the wash zone or additional stabilizer(s) can be added following the wash zone.

Suitable stabilizers for use in this process include slurries or solutions of butylated hydroxytoluene (BHT), calcium stearate, sodium stearate, multicomponent stabilization systems such as those described in U.S. Pat. No. 4,130,519 to Roper et al, incorporated herein by reference, and other degradation, oxidation and/or dehydrohalogenation inhibitors well known in the art directed to the polymer being halogenated.

In addition to the extruder-reactor features just described, the process of this invention can also incorporate filter means known in the art to effect the separation of low-viscosity wastes from the polymer stream while retaining the polymer in the extruder, screw means of suitable configuration, as described above, transversing zones (A)–(E) inclusive to properly effect the operations disclosed in said zones (including single and twin screws), a system for recycling any organic diluent that may be added to the feed zone and/or included with the halogenating agent and, optionally, means for back-mixing the extruded halogenated polymer to assure that the final, dried and packaged polymer is a homogeneous product.

Materials of construction are a significant consideration in the process herein since potentially corrosive reagents are employed. In addition to a concern for long equipment life, product stability needs to be considered if by-products of the corrosion process become incorporated into the polymer. In addition, halogenation chemistry can be affected if metals and corrosion by-products are present during the halogenation reaction. Materials of construction in the feed zone, reaction zone and neutralization zone are selected to prevent or minimize reaction of the equipment with the halogenating agent and the reaction by-products. Small amounts of such materials may cause undesirable side reactions to occur with various constituents of the polymer. Useful materials include those alloys known commercially as Hastelloy, steels coated with inert polymers (e.g., fluorocarbons), ceramics, titanium, etc. Materials which have been found to be unsatisfactory include series 300 stainless steels, Monel, and carbon Steel. Where dry neutralization is utilized other suitable materials include commercial alloys comprising nickel, cobalt, molydenum, chromium and iron as major alloying elements; commercial alloys in this class include Hastelloy B C, Xaloy 306, Stellite 6 and Triboloy. Titanium coated steel is also useful.

Following preparation of the halogenated polymer product in the extruder-reactor, product is transferred to conventional polymer processing equipment for processing and packaging. This equipment includes rubber mills, extruders of various kinds, balers, etc.

The brominated polymers of this invention can be processed in standard equipment used for each such polymer, such as internal mixers, mills, extruders, calenders, etc. Said polymers are amenable to conventional compounding practice and various fillers and extenders can be incorporated, e.g., various carbon blacks, clays, silicas, carbonates, oils, resins, waxes, etc.

The brominated butyl rubber of this invention can be cured or vulcanized by any of the prior art methods suitable for such halogenated rubbers, e.g., using sulfur, sulfur-containing curing agents (such as sulfenamide derivatives, benzothiazxyl disulfide, tetramethylthiouram disulfide, alkyl phenol disulfide, etc.), zinc oxide alone or with various promoters, and mixtures thereof. Curing is usually accomplished at a temperature of from about 140° C. to about 250° C., preferably 150° C. to about 200° C., and usually takes from 1 to 150 minutes.

As has been described above, in order to achieve a maximum conversion of type II bromine to type III bromine (primary allylic bromine) it is necessary to carry out the biologenation in an acid environment. As used in the specifications and claims, the term "acid environment" means an environment which permits the HBr by-product of bromination to contact the polymer and affect the catalyzation of the Type II to Type III rearrangement. Where the polymer contains basic materials which can react with HBr the rearrangement reaction is impeded. An acid environment is achieved using a butyl rubber feed stocks which are substantially free of acid scavengers, that is compounds which will react with the HBr. Illustrative non-limiting examples of such acid scavengers are epoxides, basic salts, hydroxides, phenates and amines, e.g., calcium stearate, ESBO. Furthermore, where the brominating agent is bromine or other agents which are gaseous at the reaction temperature the ratio of diluent, e.g. nitrogen, to brominating agent ($N_2/Br_2$) should be minimized. Preferably the ratio is less than 2/1, e.g. 0 to about 1.95/1. Additionally, where additives, stabilizers, processing aids and lubricants are added to the polymer in the scrubbing or exit zones the amount of acid scavenging material added, e.g. calcium stearate, should be 2 wt. % or less, based on the weight of the polymer, preferably about 1%. A preferred stabilizer which can be added to the polymer in the scrubbing or exit zone is a blend of calcium stearate and ESBO (an epoxidized soybean oil). The ratio of ESBO to calcium stearate is preferably about 1/1 to 1.5/1, more preferably about 1.25/1 utilized at about 1 wt. % based on the polymer.

In order to insure sufficient mixing of the polymer and residence time in the extruder the screw should have an L/D ratio of at least 35, preferably about 40 to 60 more preferably about 40 to 50.

The ratio of Type II bromine to Type III bromine in the brominated butyl rubber is preferably less than 2/1, more preferably less than 1/1, most preferably less than 0.7/1. The type III bromine generally will comprise at least 20 mole % based on the moles of unsaturation in the unbrominated butyl rubber feed; preferably about 25 mole % to 100% mole, more preferably about 30 mole % to 100 mole %, most preferably about 50 mole % to about 100 mole %.

In order to achieve the desired Type II/Type III bromine ratio it is essential that the butyl rubber feed be substantially free of acid scavengers. As used in the specification and claims with reference to the butyl rubber feed stock, the term "substantially free of acid scavengers" means butyl rubber containing 0.5 wt. % or less of such compounds. There is an interrelationship between the bromine content of the polymer and the amount of acid scavenger which can be tolerated in the feed.

At bromine levels of about 3.5 to 4.0 wt. %, the feed stock can contain about 0.5 wt. % acid scavengers. At about 3 wt. % bromine, about 0.4 wt. % of acid scavenger can be tolerated. In general the lower the acid scavenger and the higher the bromine content of the polymer the higher will be the fraction of Type III bromine, i.e., Type II/Type III ratio will be smaller. Ideally the butyl rubber feed contains no acid scavenger.

The advantages of this invention will be more readily appreciated by reference to the following examples.

EXAMPLE 1

An extruder with 2" diameter twin screws, counter-rotating and non-intermeshing was set up according to the teachings herein in order to halogenate butyl rubber (isobutylene-isoprene copolymer). The feed zone was 10 inches long and separated from the reaction zone by a reverse flighted section. The reaction zone was 47 inches long and separated from the neutralization zone with a fixed dam section. The reaction zone utilized forwarding single, double and triple flights with slots cut in several of the triple flights. Additionally, some forwarding single sections had mixing pins in the stem. The configuration in the reaction zone was designed to increase mixing, interrupt polymer flow and expose fresh surface to the halogenating agent.

The halogenating agent was bromine gas diluted with nitrogen. Halogenating agent was injected at a slight positive pressure into the vapor space of the reaction zone at a point 4 inches downstream from the beginning of the reaction zone at a rate of about 4 Kg/hr. The reaction zone contains a vent located 37 inches from the halogenating agent injection point and the vent was operated under positive pressure regulated in the range of about 45 to 90 psig.

Neutralization was achieved using nitrogen injected countercurrently, beginning 9 inches from the end of the extruder at a rate of 1 to 4 Kg/hr. A second vent was located 12 inches downstream of the reaction zone vent. Polymer feed rate was targeted at 50 Kg/hr.

Four sets of runs were made (A,B,C,D) and samples taken about every 20 minutes during each run. A total of 23 samples were evaluated. The physical properties appear in Table I, and the cure and adhesion date appears in Table II. For each change in $N_2/B_{r2}$ a feed (ESBO central & unsaturation) sufficient time was allowed for the system to reach equilibrium before sampling. The discrepancy between Ca $St_2$ ESBO introduced and that found by NMR is apparently the result of conversion of the stearate to the acid form.

It is evident that samples having type III central within the scope of this invention have better NR/C access adhesion (100° C.) and better self tac as well as caress tac.

Operating conditions for the runs described above appear in Table III.

TABLE I

EXTRUDER-REACTOR BROMINATION OF BUTYL RUBBER

| Run | Sample # | FEED[1] % Unsat | % ESBO | PROCESS $N_2/Br_2$ | % ESBO CaSt. | BROMINATED PRODUCT % BR | % CaSt[4] | % ESBO[4] | $ML(1 + 8)$ 125° C. | Structure[3] I | II | III | CDB |
|---|---|---|---|---|---|---|---|---|---|---|---|---|---|
| A | 1 | 1.5 | 0.4 | 2 | 2 | 2.0 | 1.0 | 1.1 | 42 | 24 | 60 | 12 | 5 |
| A | 2 | 1.5 | 0 | 2 | 2 | 2.2 | 0.7 | 0.8 | 33 | 36 | 20 | 35 | 10 |
| A | 3 | 1.5 | 0 | 1 | 2 | 2.2 | 0.3 | 0.7 | 26 | 29 | 18 | 44 | 10 |
| A | 4 | 1.5 | 0 | 1 | 1 | 2.0 | 0.1 | 0.6 | 25 | 36 | 13 | 42 | 10 |
| A | 5 | 1.5 | 0.1 | 2 | 2 | 2.0 | 0.8 | 0.8 | 40 | 38 | 28 | 28 | 7 |
| A | 6 | 1.5 | 0.1 | 1 | 2 | 2.1 | 0.5 | 0.8 | 37 | 30 | 17 | 41 | 13 |
| A | 7 | 1.5 | 0.1 | 1 | 1 | 2.0 | 0.2 | 0.5 | 32 | 44 | 15 | 34 | 7 |
| B | 8 | 1.5 | 0.4 | 2 | 4 | 2.8 | 1.7 | 1.9 | 39 | 0 | 67 | 24 | 10 |
| B | 9 | 1.5 | 0.1 | 2 | 2 | 2.8 | 0.6 | 0.8 | 35 | 14 | 28 | 41 | 17 |
| B | 10 | 1.5 | 0.1 | 1 | 2 | 2.7 | 0.2 | 0.7 | 29 | 12 | 16 | 41 | 24 |
| B | 11 | 1.5 | 0.1 | 1 | 1 | 2.9 | 0.1 | 0.6 | 31 | 14 | 18 | 48 | 23 |
| B | 12 | 1.5 | 0 | 2 | 2 | 2.6 | 0.6 | 0.8 | 30 | 15 | 24 | 45 | 20 |
| B | 13 | 1.5 | 0 | 1 | 2 | 3.3 | 0.2 | 0.8 | 26 | 12 | 16 | 45 | 27 |
| B | 14 | 1.5 | 0 | 1 | 2 | 4.0 | 0.1 | 0.7 | 20 | 0 | 9 | 66 | 25 |
| C | 15 | 1.5 | 0.4 | 2 | 4 | 2.5 | 1.9 | 2.2 | 40 | 13 | 44 | 33 | 10 |
| C | 16 | 2 | 0.5 | 2 | 4 | 2.4 | 2.1 | 2.5 | 43 | 33 | 45 | 16 | 6 |
| C | 17 | 2 | 0.5 | 2 | 4 | 3.7 | 1.9 | 2.2 | 41 | 8 | 52 | 27 | 13 |
| C | 18 | 2 | 0.1 | 2 | 2 | 3.7 | 1.0 | 1.0 | 42 | 0 | 40 | 40 | 20 |
| C | 19 | 2 | 0.1 | 2 | 1 | 3.9 | 0.2 | 0.5 | 35 | 0 | 39 | 41 | 20 |
| C | 20 | 2 | 0.1 | 2 | 1 | 2.5 | 0.5 | 0.6 | 41 | 33 | 32 | 21 | 14 |
| D | 21 | 2 | 0 | 2 | 2 | 2.4 | 1.1 | 0.9 | 41 | 32 | 18 | 28 | 13 |
| D | 22 | 2 | 0 | 2 | 1 | 2.3 | 0.3 | 0.6 | 38 | 39 | 18 | 27 | 10 |
| D | 23 | 2 | 0 | 2 | 1 | 3.2 | 0.1 | 0.6 | 28 | 16 | 23 | 39 | 23 |

[1]A butyl rubber feed stock having a Mooney viscosity (ML++ 8 @ 125 degrees C.) of 47 which was low in zinc was used to sack run. The feed for runs 1–15 had 1.5% unsaturation and that for Runs 16-23 had an unsaturation of 2 mole wt. %
[2]A mixture of 1.25 parts ESBO by weight and 1 part calcium stearate was added at the end of the neutralization zone.
[3]Structure was determined by NMR; Type I structure is isoprene unsaturation.
[4]Analysis by infra red.

TABLE II

CURE AND ADHESION CHARACTERISTICS OF TYPE III BROMINATED BUTYL RUBBER

| | Sample # | | | | | | | | | | | |
|---|---|---|---|---|---|---|---|---|---|---|---|---|
| Test[1] | 1 | 2 | 3 | 4 | 5 | 6 | 7 | 8 | 9 | 10 | 11 | 12 |
| ZnO Test Cure: 160 degrees C. | | | | | | | | | | | | |
| $M_{30}$—$M_L$, in-lb. | 17 | 19 | 13 | 10 | 14 | 12 | 9.2 | 30 | 24 | 24 | 21 | 19 |
| t'90, min. | 15 | 11 | 12 | 16 | 10 | 16 | 15 | 8.8 | 12 | 12 | 13 | 13 |
| Sulfur Test Cures | | | | | | | | | | | | |
| $M_{30}$—$M_L$ | 30 | 24 | 22 | 20 | 25 | 22 | 24 | 39 | 29 | 27 | 25 | 25 |
| $M_{30}$—$M_{7,5}$ | 1.7 | 4.2 | 3.7 | 5.0 | 4.5 | 4.0 | 6.7 | 1.5 | 4.1 | 4.7 | 4.0 | 2.6 |
| Innerliner Compound | | | | | | | | | | | | |
| $M_L(1 + 4)$ 100° C. | 62 | 53 | 49 | 47 | 57 | 58 | 53 | 60 | 57 | 55 | 55 | 56 |
| Scorch t3, min | 16 | 13 | 14 | 17 | 16 | 15 | 16 | 12 | 10 | 9.4 | 11 | 12 |
| $M_H$—$M_L$ Rheometer 160° C. | 14 | 12 | 11 | 9.5 | 11 | 11 | 9.5 | 16 | 13 | 12 | 11 | 13 |
| t'90 | 25 | 27 | 25 | 33 | 24 | 28 | 30 | 19 | 23 | 25 | 26 | 24 |
| Adhesion to NR Carcass | | | | | | | | | | | | |
| 25° C. | 166 | 153 | 122 | 81 | 163 | 131 | 123 | 158 | 162 | 146 | 137 | 159 |
| 100° C. | 57 | 45 | 31 | 18 | 80 | 42 | 25 | 75 | 108 | 93 | 77 | 69 |
| Self Tack | 7.8 | 7.4 | 9.3 | 12.1 | 8.0 | 6.6 | 16.9 | 6.6 | 6.5 | 6.6 | 5.1 | 6.4 |
| Carcass Tack | 5.1 | 6.6 | 6.3 | 8.8 | 7.0 | 8.1 | 7.4 | 5.9 | 7.8 | 8.0 | 8.0 | 7.5 |
| BrBu Properties | | | | | | | | | | | | |
| % Br (by Dietert) | 2.0 | 2.2 | 2.2 | 2.0 | 2.0 | 2.1 | 2.0 | 2.8 | 2.8 | 2.7 | 2.9 | 2.6 |
| Structure by NMR | | | | | | | | | | | | |
| Type I | 24 | 36 | 29 | 36 | 38 | 30 | 44 | 0 | 14 | 12 | 14 | 15 |
| II | 60 | 20 | 18 | 13 | 28 | 17 | 15 | 67 | 28 | 16 | 18 | 24 |
| III | 12 | 35 | 44 | 42 | 28 | 41 | 34 | 24 | 24 | 41 | 48 | 45 |
| CDB | 5 | 10 | 10 | 10 | 7 | 13 | 7 | 10 | 17 | 24 | 23 | 20 |

| | Sample # | | | | | | | | | | SRP[3] |
|---|---|---|---|---|---|---|---|---|---|---|---|
| Test[1] | 13 | 14 | 15 | 16 | 17 | 18 | 19 | 20 | 21 | 22 | 23 | MD-82-8 |
| ZnO Test Cure: 160 degrees C. | | | | | | | | | | | | |
| $M_{30}$—$M_L$, in-lb. | 28 | 35 | 21 | 23 | 54 | 56 | 48 | 23 | 17 | 14 | 32 | (25)[2] |

TABLE II-continued
CURE AND ADHESION CHARACTERISTICS OF TYPE III BROMINATED BUTYL RUBBER

| | | | | | | | | | | | | |
|---|---|---|---|---|---|---|---|---|---|---|---|---|
| t'90, min. | 11 | 11 | 9.8 | 12 | 4.9 | 3.2 | 3.5 | 10 | 9.8 | 13 | 6.5 | (14) |
| Sulfur Test Cures | | | | | | | | | | | | |
| $M_{30}-M_L$ | 25 | 30 | 38 | 43 | 53 | 53 | 52 | 35 | 26 | 29 | 35 | (37) |
| $M_{30}-M_{7.5}$ | 3.5 | 4.4 | 2.4 | 4.3 | 2.8 | 2.1 | 2.0 | 6.6 | 4.1 | 6.1 | 3.8 | (3) |
| Innerliner Compound | | | | | | | | | | | | |
| $M_L(1+4)$ 100° C. | 53 | 43 | 59 | 64 | 63 | 61 | 58 | 61 | 59 | 57 | 52 | 51 |
| Scorch t3, min | 8.8 | 6.2 | 14 | 13 | 10 | 7.9 | 7.9 | 13 | 11 | 12 | 7.9 | 24 |
| $M_H-M_L$ Rheometer160° C. | 13 | 15 | 16 | 17 | 22 | 23 | 24 | 15 | 13 | 12 | 17 | 24 |
| t'90 | 26 | 37 | 22 | 25 | 20 | 24 | 26 | 24 | 31 | 32 | 33 | 25 |
| Adhesion to NR Carcass | | | | | | | | | | | | |
| 25° C. | 163 | 134 | 81 | 63 | 108 | 108 | 57 | 76 | 150 | 118 | 114 | 126 |
| 100° C. | 68 | 85 | 59 | 48 | 68 | 56 | 46 | 53 | 56 | 53 | 50 | 46 |
| Self Tack | 9.0 | 11.4 | 8.3 | 6.6 | 6.8 | 7.3 | 5.9 | 6.5 | 6.0 | 7.4 | 10.8 | 5.9 |
| Carcass Tack | 9.9 | 9.1 | 7.1 | 7.0 | 8.8 | 6.4 | 5.6 | 7.0 | 5.8 | 6.5 | 8.4 | 6.6 |
| BrBu Properties | | | | | | | | | | | | |
| % Br (by Dietert) | 3.3 | 4.0 | 2.5 | 2.4 | 3.7 | 3.7 | 3.9 | 2.5 | 2.4 | 2.3 | 3.2 | (2.1) |
| Structure by NMR | | | | | | | | | | | | |
| Type I | 12 | 0 | 13 | 33 | 8 | 0 | 0 | 33 | 42 | 39 | 16 | (25) |
| II | 16 | 9 | 44 | 45 | 52 | 40 | 39 | 32 | 18 | 18 | 23 | (60) |
| III | 41 | 45 | 66 | 33 | 16 | 27 | 40 | 41 | 28 | 27 | 39 | (10) |
| CDB | 27 | 25 | 10 | 6 | 13 | 20 | 20 | 14 | 13 | 16 | 23 | (5) |

(1)Note: All compunded data on E.R. BrBus' done at total measured $CaSt_2 = 2\%$ and ESBO = 2.5% (on rubber) by adding some $CaSt_2$ and ESBO in Banbury mixing.
(2)Data in parentheses are estimates.
(3)A commercial solvent replacement brominated butyl rubber having a Mooney (ML 1++8), 125 C.) of 32 and a bromine content of 2.0–2.1 wt. %

TABLE III
EXTRUDER REACTOR OPERATING CONDITIONS

| Sample # | Screw Speed RPM | Rubber Rate kg/hr. | Bromine Rate kg/hr. | Temp °C. | Bromine Pressure Bars Abs. |
|---|---|---|---|---|---|
| 1 | 158 | 50 | 2.2 | 100–105 | 3.8 |
| 2 | 158 | 50 | 2.7 | 100–103 | 5.2 |
| 3 | 152 | 50 | 2.6 | 100–105 | 3.4 |
| 4 | 152 | 50 | 2.5 | 100–105 | 2.4 |
| 5 | 148 | 50 | 2.3 | 100–105 | 5.2 |
| 6 | 147 | 50 | 2.4 | 100–105 | 4.1 |
| 7 | 152 | 50 | 2.4 | 100–105 | 2.8 |
| 8 | 147 | 52 | 3.3 | 105 | 6.2 |
| 9 | 142 | 52 | 3.3 | 103 | 6.9 |
| 10 | 144 | 52 | 3.3 | 103 | 5.6 |
| 11 | 144 | 52 | 3.3 | 101 | 4.2 |
| 12 | 135 | 52 | 3.9 | 105 | 6.7 |
| 13 | 140 | 52 | 3.7 | 102 | 6.0 |
| 14 | 140 | 52 | 3.7 | 105 | 5.9 |
| 15 | 128 | 54 | 2.3 | 113 | 5.5 |
| 16 | 120 | 54 | 2.3 | 113 | 5.0 |
| 17 | 132 | 54 | 2.3 | 113 | 6.0 |
| 18 | 130 | 54 | 4.7 | 108 | 6.8 |
| 19 | 125 | 54 | 4.7 | 108 | 6.9 |
| 20 | 125 | 54 | 2.2 | 108 | 5.9 |
| 21 | 122 | 52 | 2.4 | 103 | 6.6 |
| 22 | 120 | 52 | 2.5 | 103 | 6.0 |
| 23 | 128 | 52 | 4.1 | 103 | 6.7 |

What is claimed is:

1. A process for the continuous bromination of a butyl rubber polymer wherein the brominated polymer contains at least 1.5 wt. % bromine and at least 20 mole % of the bromine, based on the initial mole % of unsaturation in the unbrominated butyl rubber is in the ENDO allylic (Type III) configuration, which comprises contacting a cohesive mass of butyl rubber, said rubber being substantially free of acid scavengers, with a brominating agent at an elevated temperature in a continuous flow device, under an acid environment, for a time sufficient to brominate the butyl rubber and cause a rearrangement of a substantial fraction of the contained bromine from an EXO allylic (Type II) configuration to the Type III configuration, said continuous flow device comprising means for conveying said polymer through said device wherein by-product formed by the reaction of the brominating agent with the butyl rubber and any unreacted halogenating agent are disengaged from said brominated butyl rubber means in said continuous flow device downstream of the contact between the butyl rubber and the brominating agent by means comprising deforming and disrupting said brominating polymer and injecting an effective amount of an inert gas thereby neutralizing said brominated polymer by disengaging bromination reaction by-products and unreacted brominating agent.

2. The process of claim 1 wherein said polymer mass is subjected to deformation and disruption and wherein said polymer and said brominating agent are present during contact as either co-continuous phases or wherein said brominating agent is present as a continuous phase and said polymer is present as a discontinuous phase or wherein the region in which said polymer and said halogenating agent are contacted is filled with said polymer.

3. The process of claim 1 wherein said butyl rubber is isobutylene-isoprene copolymer.

4. The process of claim 1 wherein said brominating agent is selected from the group consisting of bromine gas, bromine liquid, bromine chloride, sulfur bromide and N-bromosuccinimide.

5. The process according to claim 4 wherein the brominating agent is gaseous at the temperature of the reaction.

6. The process according to claim 5 wherein there is a relationship between the reaction temperature and the reaction pressure whereby the temperature is above the dew point of the brominating agent.

7. The process according to claim 5 wherein the bromination is carried out at a reaction pressure of about 45 to about 100 psia.

8. The process of claim 1, further comprising adding a diluent to said rubber feed before, at or near the point of addition of said feed.

9. The process of claim 8 wherein said diluent is selected from the group consisting of volatile saturated hydrocarbons, chlorohydrocarbons, chlorocarbons, non-hydrocarbons, and hydrocarbon oils.

10. The process of claim 9 wherein said diluent is selected from the group consisting of pentane, hexane, methylene chloride, chloroform, carbon tetrachloride, carbon dioxide, and inert gas.

11. The process of claim 10 wherein said diluent is present in an amount less than about 50 percent by weight based on the weight of rubber.

12. The process of claim 6 wherein said brominating agent is selected from the group consisting of bromine and bromine chloride.

13. The process of claim 6 wherein said brominating agent is diluted with diluent.

14. The process of claim 13 wherein said diluent is a gas selected from the group consisting of nitrogen, argon, air and $CO_2$.

15. The process of claim 8 wherein said brominating agent is diluted with a diluent and wherein the total amount of diluent added to said feed and brominating agent diluent is less than about 50 percent by weight based on the weight of polymer.

16. The process of claim 15 wherein said diluent added to said feed is selected from the group consisting of volatile saturated hydrocarbons, chlorohydrocarbons, chlorocarbons and hydrocarbon oils.

17. The process according to claim 1 wherein the polymer is neutralized by injecting an effective amount of an inert gas thereby disengaging bromination reaction products and unreacted brominating agent.

18. The process of claim 17 further comprising vent means in the inert gas injection region.

19. The process of claim 17 further comprising pressure control means in the inert gas injection region in order to explosively disengage said bromination reaction by-products and said unreacted halogenating agent.

20. The process of claim 17 wherein said injected inert gas and said brominated polymer are conveyed co-currently or countercurrently through said device in a neutralization zone following contact between said polymer and brominating agent.

21. The process of claim 20 wherein said co-current conveyance of said neutralizing means is initiated at the beginning of said neutralization zone or shortly thereafter.

22. The process of claim 21 further comprising a supplementary inert gas injection step.

23. The process of claim 22 wherein said supplementary injection step is performed in a separate scrubbing zone.

24. The process of claim 18 further comprising a stabilizer addition zone wherein a degradation, oxidation or dehydrohalogenation stabilizer is added to said halogenated polymer.

25. The process of claim 22 wherein a degradation, oxidation or dehydrohalogenation stabilizer is added following said supplementary inert gas injections step.

26. The process of claim 1 further comprising a final exit zone.

27. The process of claim 26 wherein the temperature of said brominated rubber is adjusted for delivery from said exit zone at a temperature lower than about 130° C.

28. The process of claim 26 wherein a degradation, oxidation or dehydrohalogenation stabilizer is added to said exit zone.

29. The process of claim 22 further comprising filter means to effect the separation of undispersed materials from said halogenated polymer.

30. The process of claim 18 wherein said vent means are under vacuum.

31. The process of claim 1 wherein said contact occurs in a vented reaction zone.

32. The process of claim 1 wherein said continuous flow device is selected from the group consisting of a kneader, a single- or multiple screw extruder and a continuous mixer, and a cavity transfer mixer.

33. The process of claim 1 wherein said means for conveying said polymer is screw means.

34. The process according to claim 32 wherein the extruder has an L/D ratio of at least 35.

35. The process according to claim 34 wherein L/D is about 40 to about 60.

36. The process according to claim 35 wherein L/D is about 40 to about 50.

37. The process of claim 1 wherein said deformation and disruption generates a degree of mixing of said halogenated polymer and inert gas such that the scale of segregation is less than 50 microns.

38. The process according to claim 14 wherein the weight ratio diluent gas to brominating agent is less than 2/1.

39. The process according to claim 38 wherein the diluent gas is nitrogen.

40. The process of claim 1 wherein said disengaging means comprises vent means and/or means for neutralizing by-product of the bromination reaction and/or unreacted brominating agent.

41. The process according to claim 34 wherein the extruder comprises an extruder barrel and a screw means, said screw means having a major flight diameter and a minor land area diameter, wherein there is a clearance between said major flight diameter and said barrel, said clearance being such that the ratio of said clearance to one half of said major flight diameter is at least 0.05.

42. The process according to claim 41 wherein said ratio is about 0.080 to about 0.130.

43. The process according to claim 1 wherein Type II and Type III bromine are present in a ratio of Type II to Type III of less than 2.

44. The process according to claim 43 wherein the ratio of Type II to Type III bromine is less than 1.

45. The process according to claim 1 wherein the bromination is carried out at a temperature in excess of 120° C. to about 190° C.

46. The process according to claim 45 where the temperature is about 125° C. to about 175° C.

47. The process according to claim 46 wherein the temperature is about 125° C. to about 140° C.

48. A process for the continuous bromination of a butyl rubber polymer wherein the brominated polymer contains at least 1.5 wt. % bromine and at least 20 mole % of the bromine, based on the initial mole % unsaturation in the unbrominated butyl rubber is in the ENDO allylic (Type III) configuration which comprises reacting the polymer, which is substantially free of acid scavengers, with a brominating agent in an extruder-reactor, said extruder-reactor comprising zones (A), (B) and (C) and conveying means traversing said zones; zone (A), feed zone having conditions of temperature and pressure sufficient to generate a cohesive mass of polymer; zone (B), reaction zone, in which said brominating agent and said polymer are contacted at conditions of temperature and pressure, resulting in a product mixture comprising brominated polymer, reaction by-products and unreacted brominating agent, said brominated polymer having a contained bromine initially in the EXO allylic (Type II) configuration and said temperature and pressure being sufficient to cause a rearrangement of a substantial fraction of said Type II bromine to the Type III configuration; and zone (C) neutralization zone, wherein reaction by-product and unreacted halogenating agent are disengaged from said brominated polymer mass by means comprising deforming and disrupting said brominating polymer, thereby continually generating new polymer surface and injecting an effective amount of inert gas thereby neutralizing said brominated polymer by disengaging bromination reaction by-products and unreacted brominating agent.

49. The process according to claim 48 further comprising vent means in said neutralization zone.

50. The process according to claim 48 wherein said conveying means comprises screw means wherein said screw means is configured so as to avoid restricting the exiting flow of inert gas and disengaging materials.

51. The process of claim 48 further comprising first flow restriction means between zones A and B, and second flow restriction means between zones B and C.

52. The process of claim 49 wherein a vacuum is applied to said vent means.

53. The process of claim 48 wherein said deformation and disruption generates a degree of mixing of said halogenated polymer and inert gas such that the scale of segregation is less than 50 microns.

54. The process of claim 51 wherein said restriction means following said feed zone is selected from the group consisting of a reverse flighted screw section, a filled screw section, a shallow flighted screw section, and an unflighted screw section.

55. The process of claim 54 wherein said restriction means is about 0.5 to about 8 screw diameters in length.

56. The process of claim 52 wherein said restriction means following said feed zone comprises said reaction zone.

57. The process of claim 48 wherein said means for producing said deformation is selected from the group consisting of a reverse flighted screw section, a multiple reverse flighted screw section, a pin section, a series of very short alternating reverse and forward screw sections, multiple flight screw section, interrupted flight section, a cavity transfer mixer, and combinations thereof.

58. The process of claim 51 wherein said restriction means separating said neutralization zone from said reaction zone is selected from the group consisting of a reverse flighted screw section, a filled screw section, a shallow flighted screw section, and an unflighted screw section.

59. The process of claim 51 wherein each of said restriction means is an unflighted screw section with a diameter of from 5 to 25 percent larger than the root diameter of the upstream screw section, but not greater than the upstream screw flight diameter.

60. The process of claim 51 wherein said conveying means is screw means.

61. The process according to claim 48 wherein the extruder reactor has an L/D ratio of at least 35.

62. The process according to claim 61 wherein L/D is about 40 to about 60.

63. The process according to claim 62 wherein L/D is about 50 to about 50.

64. The process according to claim 48 wherein the extruder-reactor comprises an extruder barrel and a screw means, said screw means having a major flight diameter and a minor land area diameter, wherein there is a clearance between said major flight diameter and said barrel, said clearance being such that the ratio of said clearance to one-half of said major flight diameter is at least 0.050.

65. The process according to claim 64 wherein said ratio is about 0.080 to about 0.130.

66. The process of claim 58 wherein said screw means is selected from the group consisting of single and multiple screws.

67. The process of claim 60 wherein said shear forces are generated in said reaction zone by operating said screw means at a rotation rate of from 50 to 600 RPM.

68. The process of claim 48 wherein the material used in the construction of one or more of said zones is selected from the group consisting of alloys comprising nickel, cobalt, molybdenum, chromium and iron as major alloying elements, and steel coated with inert polymer ceramic or titanium.

69. The process of claim 48 wherein the polymer in the feed zone is subjected to a pressure of up to about 600 psig.

70. The process of claim 51 wherein the neutralizing agent is an inert gas and said inert gas is injected at or adjacent the downstream end of said second restriction means.

71. The process of claim 48 wherein said inert gas is injected into said neutralization zone so as to flow countercurrent to the flow of said halogenated product mixture.

72. The process of claim 48 further comprising a supplementary inert gas injection step.

73. The process of claim 72 wherein said supplementary injection step is performed in a separate scrubbing zone (D) which follows said neutralization zone, prior to delivering said halogenated polymer product.

74. The process of claim 48 further comprising a final exit zone (E).

75. The process of claim 48 further comprising stabilizer addition wherein a degradation, oxidation or dehydrohalogenation stabilizer is added to said brominated polymer.

76. The process of claim 74 wherein the temperature of said halogenated polymer is adjusted for delivery from said exit zone at a temperature lower than about 130° C.

77. The process of claim 72 wherein a degradation, oxidation or dehydrohalogenation stabilizer is added in said supplementary inert gas injection step.

78. The process of claim 48 wherein a degradation, oxidation, or dehydrohalogenation stabilizer is added to said exit zone.

79. The process of claim 73 wherein said extruder-reactor further comprises filter means to effect the separation of undispersed materials from said halogenated polymer.

80. The process of claim 48 wherein said polymer mass is subjected to deformation and disruption in said reaction zone and wherein said polymer and said brominating agent form co-continuous phases within said reaction zone or are present during contact as either co-continuous phases or wherein said brominating agent is present as a continuous phase and said polymer is present as a discontinuous phase or wherein said brominating agent is injected at a position filled with said polymer.

81. The process of claim 48 wherein said butyl rubber is isobutylene-isoprene copolymer.

82. The process according to claim 54 wherein the brominating agent is bromine gas, bromine liquid, bromine chloride, sulfur bromide and N-bromosuccinimide.

83. The process of claim 82 wherein said brominating agent is selected from the group consisting of bromine and bromine chloride.

84. The process of claim 82 wherein said brominating agent is diluted with diluent.

85. The process of claim 84 wherein said diluent is a gas selected from the group consisting of nitrogen, argon, air and $CO_2$.

86. The process of claim 48 further comprising adding a diluent to said rubber feed before, at or near the point of addition of said feed.

87. The process of claim 86 wherein said diluent is selected from the group consisting of volatile saturated hydrocarbons, chlorohydrocarbons, chlorocarbons, non-hydrocarbons and hydrocarbon oils.

88. The process of claim 87 wherein said diluent is selected from the group consisting of pentane, hexane, methylene chloride, chloroform, carbon tetrachloride, carbon dioxide, and inert gas.

89. The process of claim 88 wherein said diluent is present in an amount less than about 50 percent by weight based on the weight of rubber.

90. The process of claim 86 wherein said halogenating agent is diluted with a diluent and wherein the total amount of diluent added to said feed and halogenating agent is less than about 50 percent by weight based on the weight of butyl rubber.

91. The process of claim 86 wherein said diluent added to said feed is selected from the group consisting of volatile saturated hydrocarbons, chlorohydrocarbons, chlorocarbons and hydrocarbon oils.

92. The process of claim 81 wherein the temperature in said reaction zone is less than about 190° C.

93. The process according to claim 54 wherein said disengaging means comprises vent means and/or means for neutralizing by-product of the bromination reaction and/or unreacted brominating agent.

94. The process of claim 48 wherein said neutralizing means is injected into said neutralization zone so as to flow countercurrent to the flow of said halogenated product mixture.

95. The process of claim 48 further comprising a final exit zone (E).

96. The process of claim 95 wherein the temperature of said halogenated polymer is adjusted for delivery from said exit zone at a temperature lower than about 130° C.

97. The process of claim 95 wherein a degradation, oxidation, or dehydrohalogenation stabilizer is added to said exit zone.

98. The process of claim 48 wherein said extruder-reactor further comprises filter means to effect the separation of nonpolymer-bound materials from said halogenated polymer.

99. The process according to claim 85 wherein the weight ratio of diluent gas to brominating agent is less than 2/1.

100. The process according to claim 99 wherein the diluent is nitrogen.

101. The process according to claim 48 where Type II and Type III bromine are present in a ratio of Type II to Type III of less than 2.

102. The process according to claim 101 where the ratio of Type II to Type III bromine is less than 1.

103. The process according to claim 48 where the bromination is carried out at a temperature in excess of 120° C. to about 190° C.

104. The process according to claim 103 wherein the temperature is about 125° C. to about 145° C.

105. The process according to claim 104 wherein the temperature is about 125° C. to about 140° C.

106. The process according to claim 1 wherein the ratio of bromine in the polymer to initial olefinic unsaturation in the feed polymer is at least 0.7/1.

107. The process according to claim 106 wherein said ratio is at least 1/1.

108. The process according to claim 48 wherein the ratio of bromine in the polymer to initial olefinic unsaturation in the feed polymer is at least 0.7/1.

109. The process according to claim 108 wherein said ratio is at least 1/1.

* * * * *